3,513,629
OVERWRAP PACKING MACHINES
Frank V. N. Hoagland, Fairlawn, and Arthur J. Griner, Wyckoff, N.J., assignors to National Biscuit Company, a corporation of New Jersey
Filed Dec. 8, 1967, Ser. No. 695,543
Int. Cl. B65b 51/30
U.S. Cl. 53—182     10 Claims

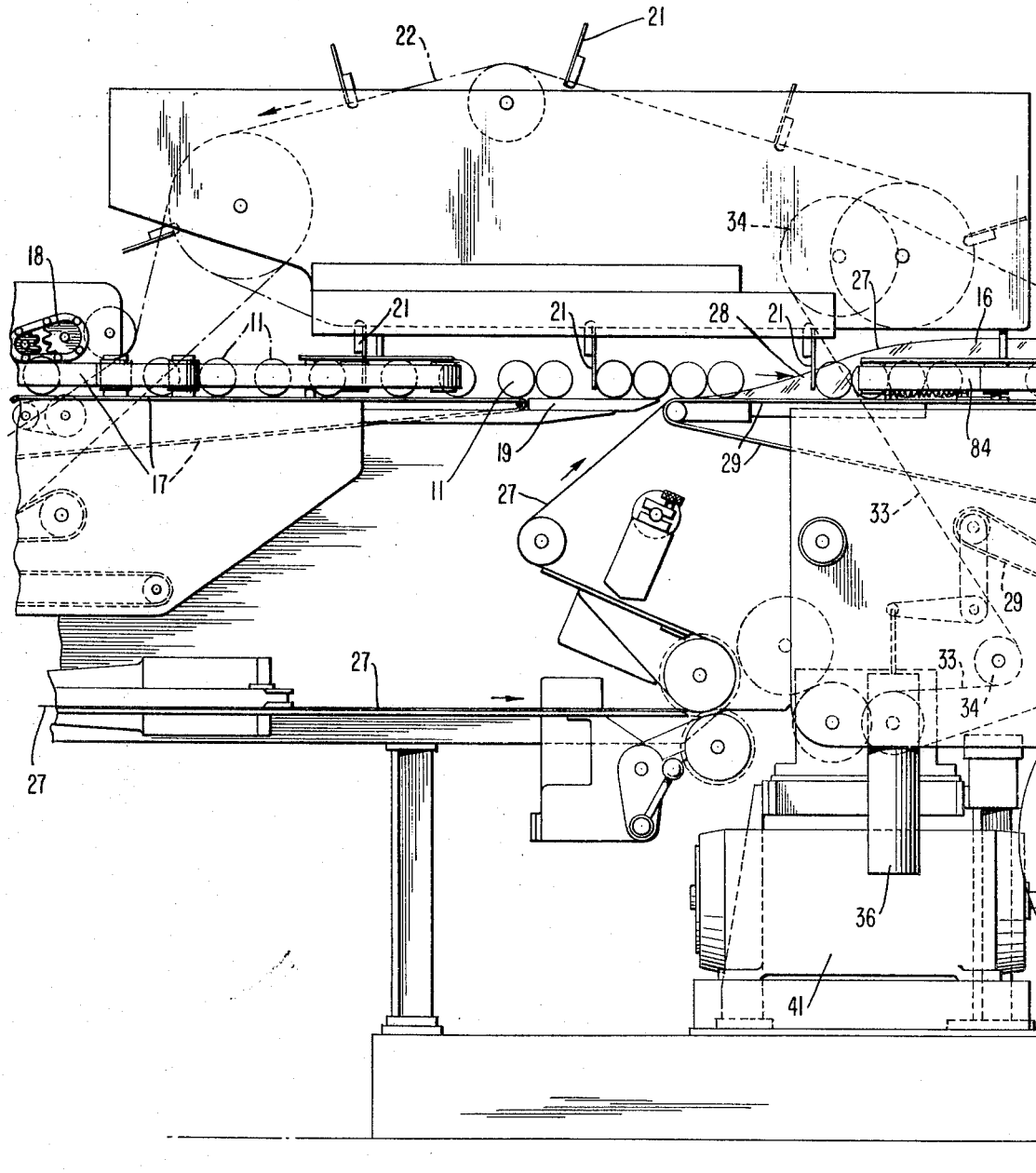

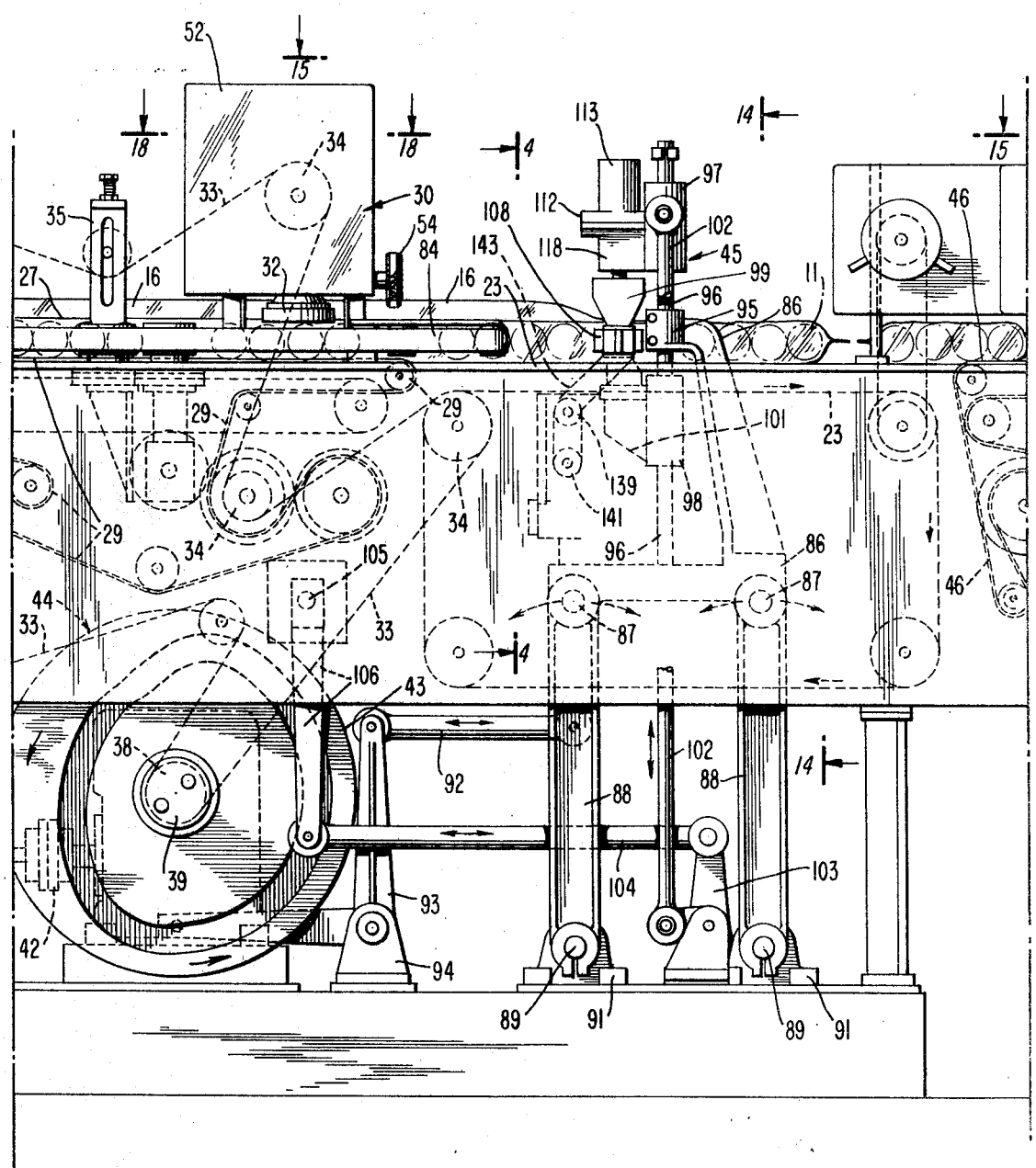

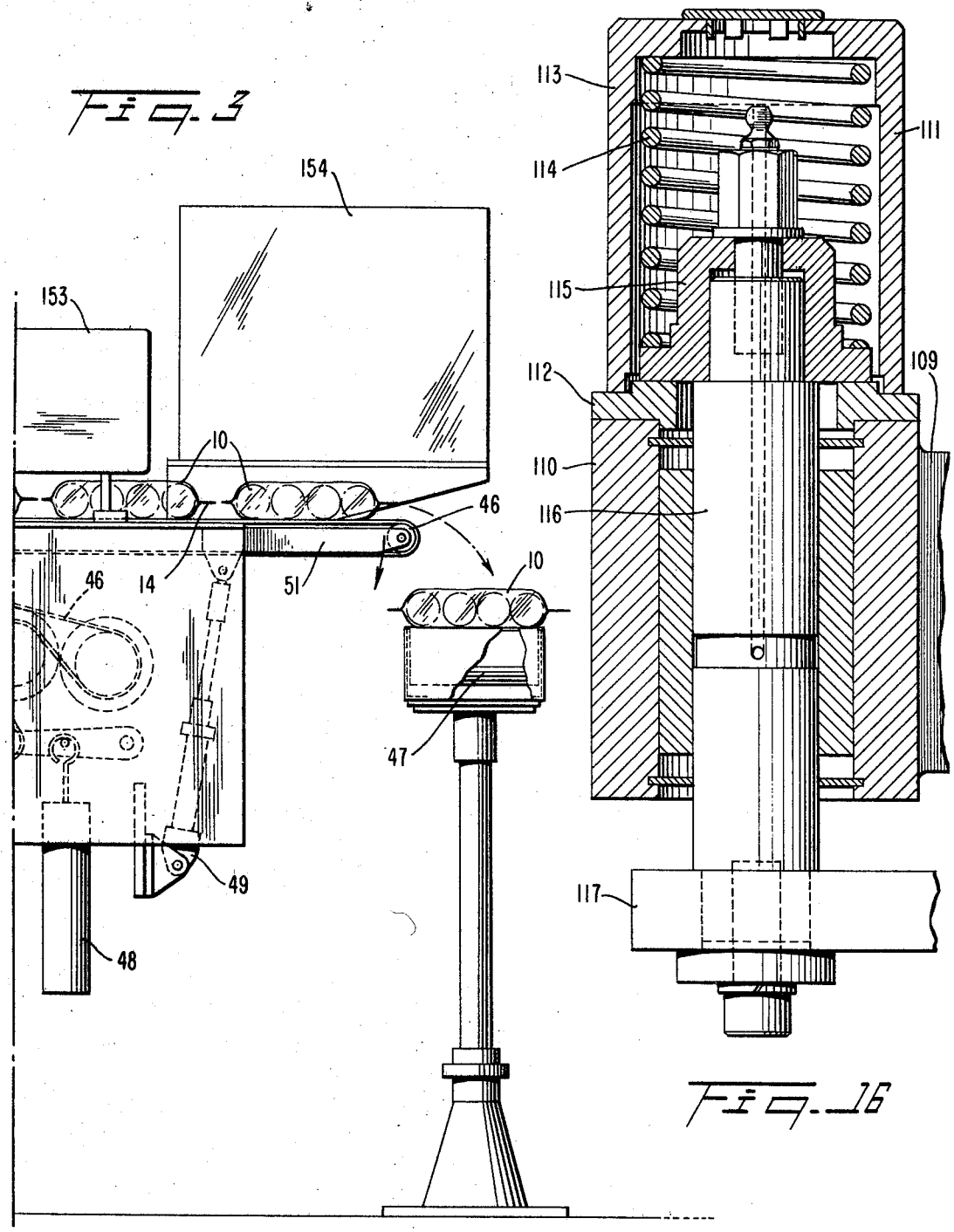

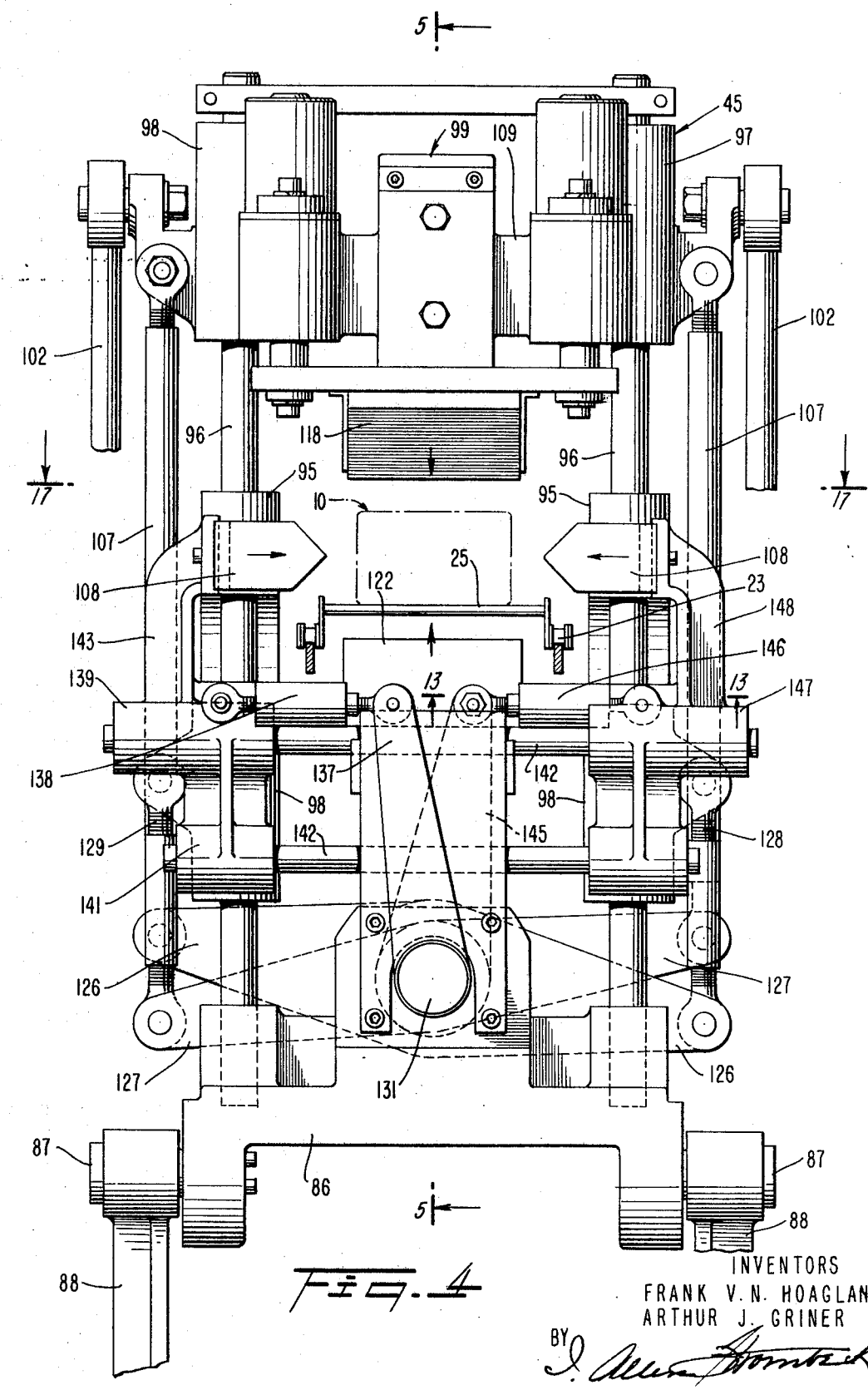

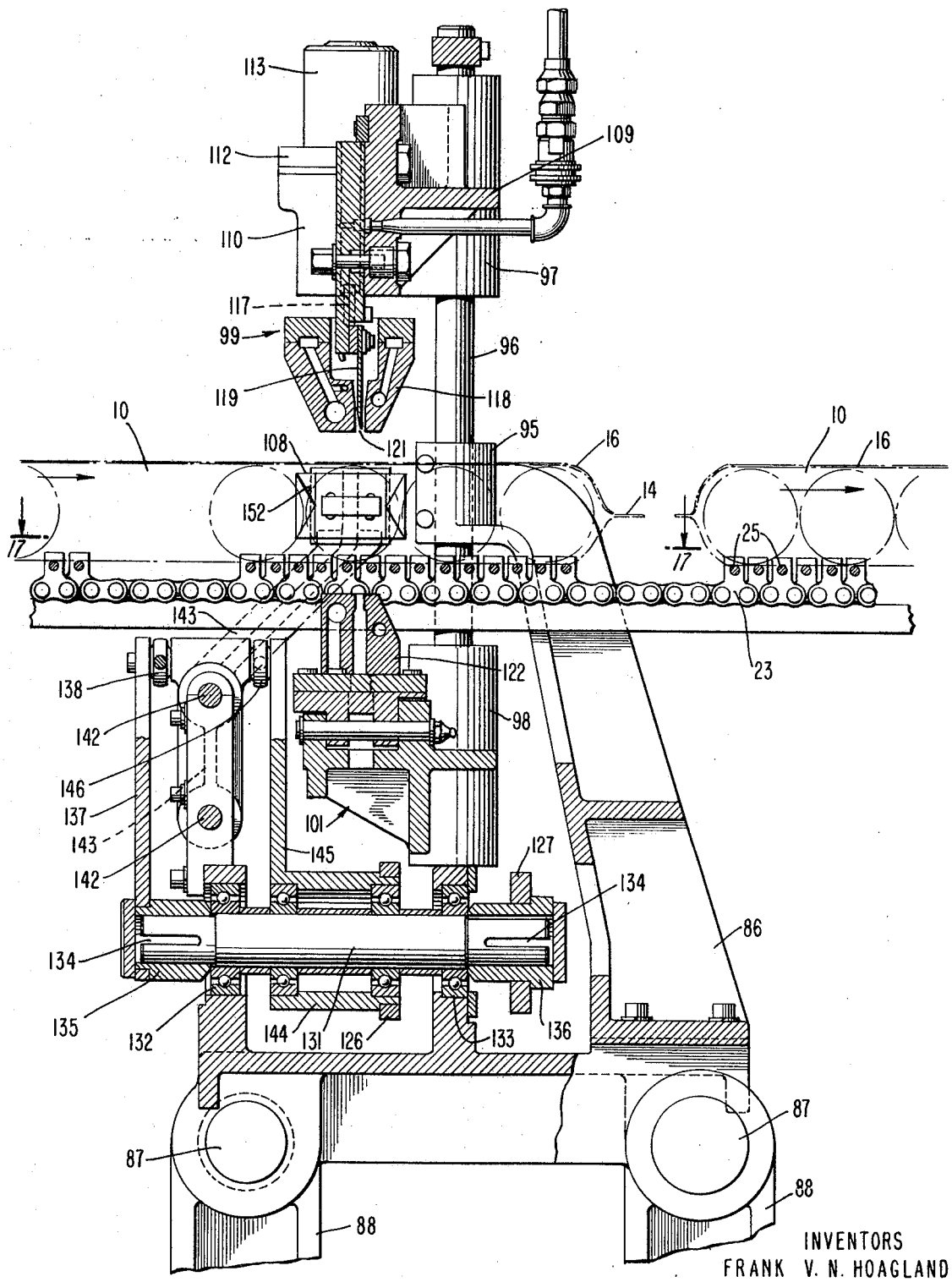

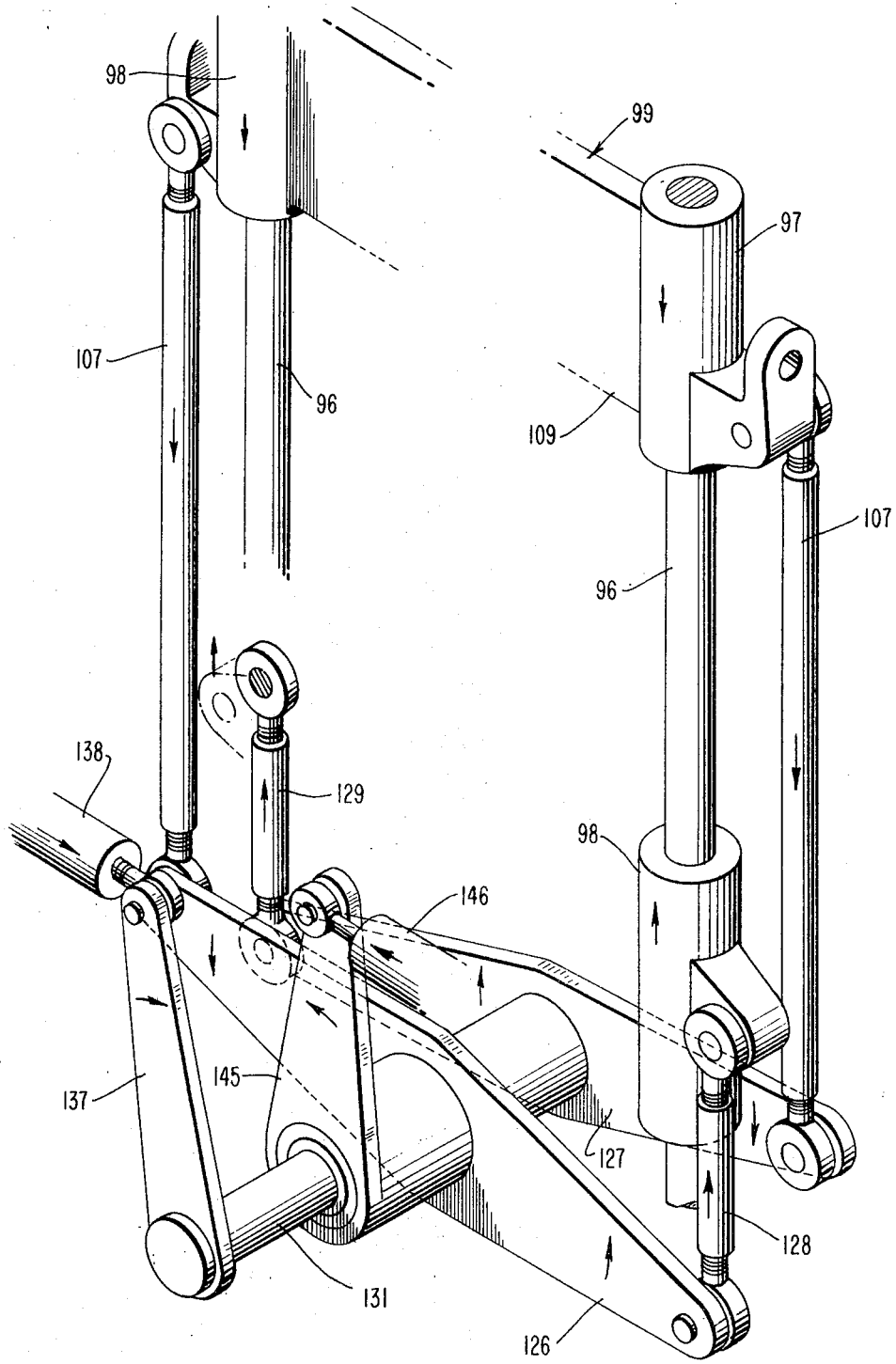

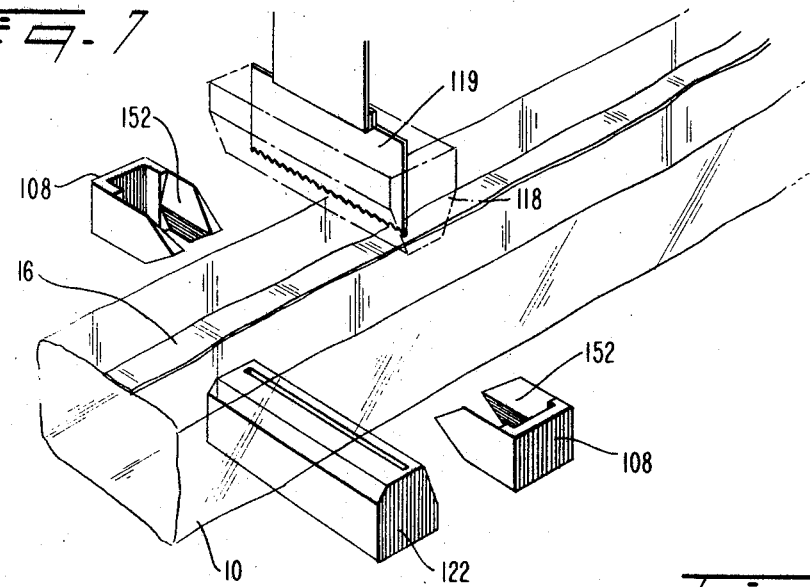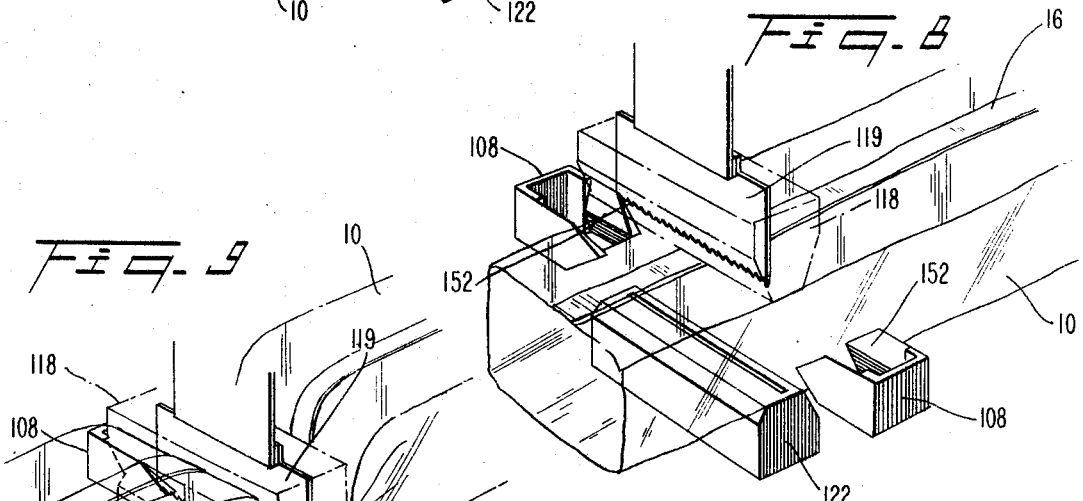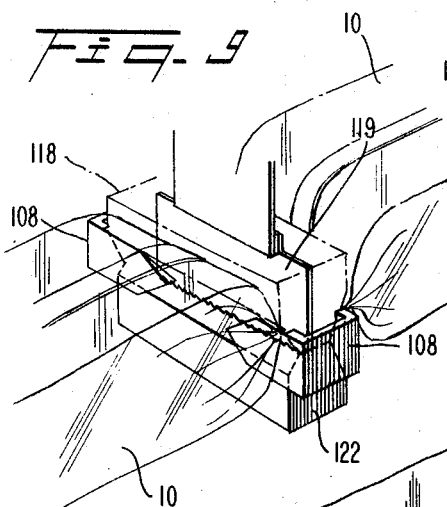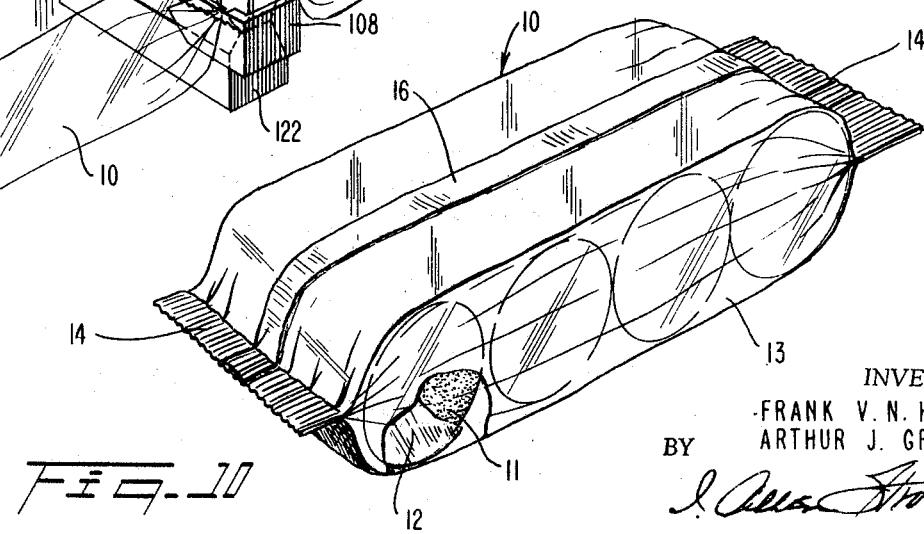

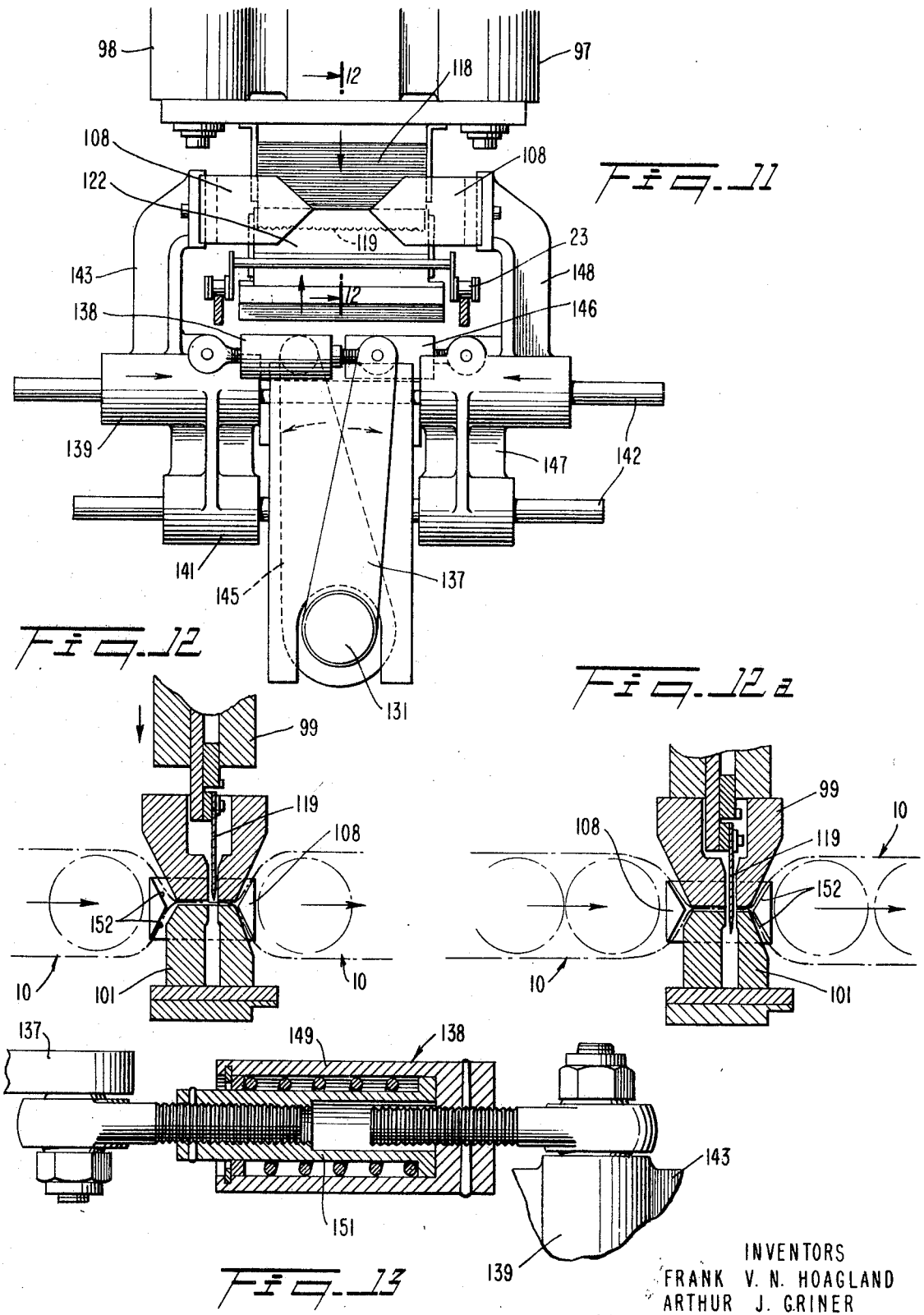

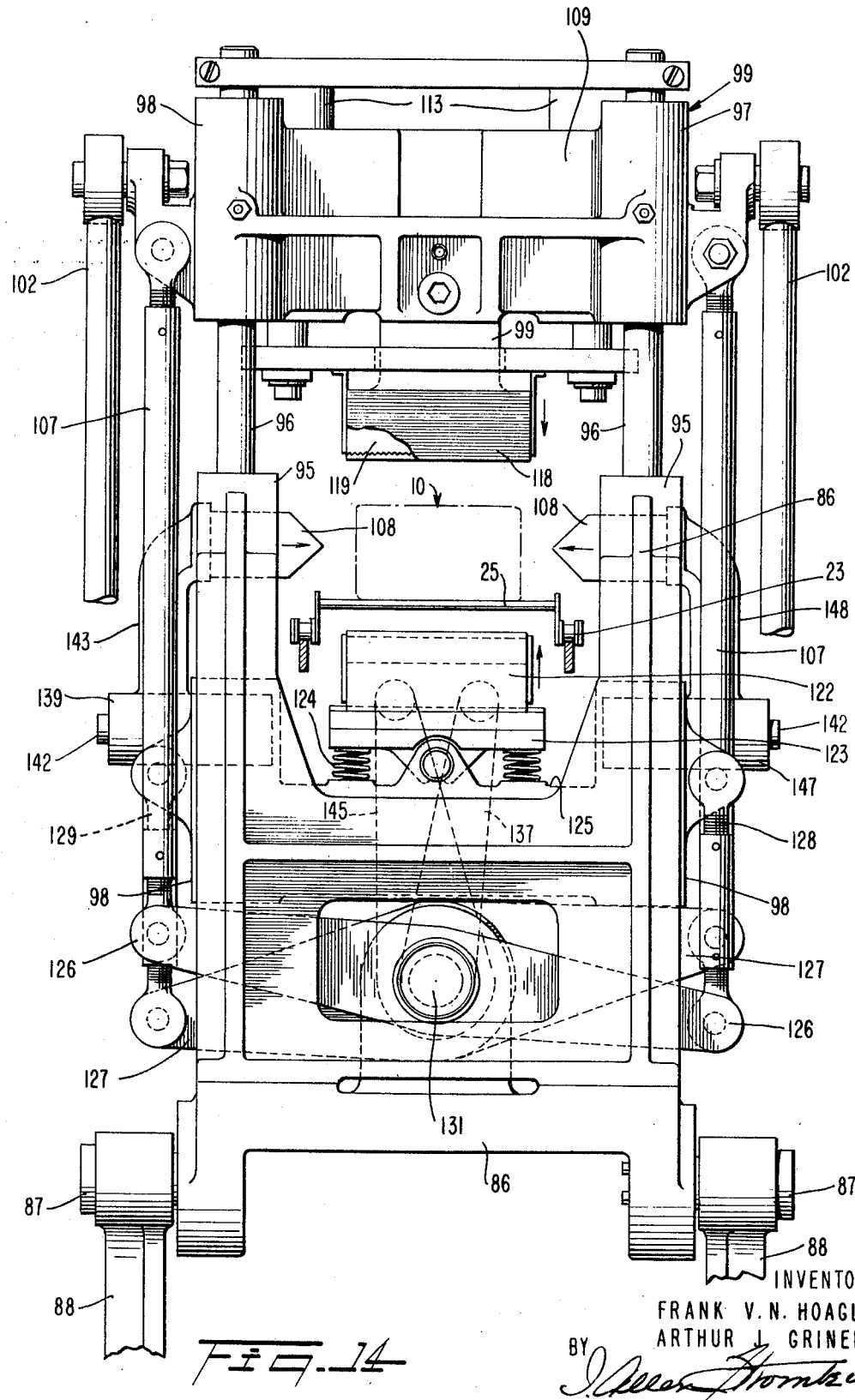

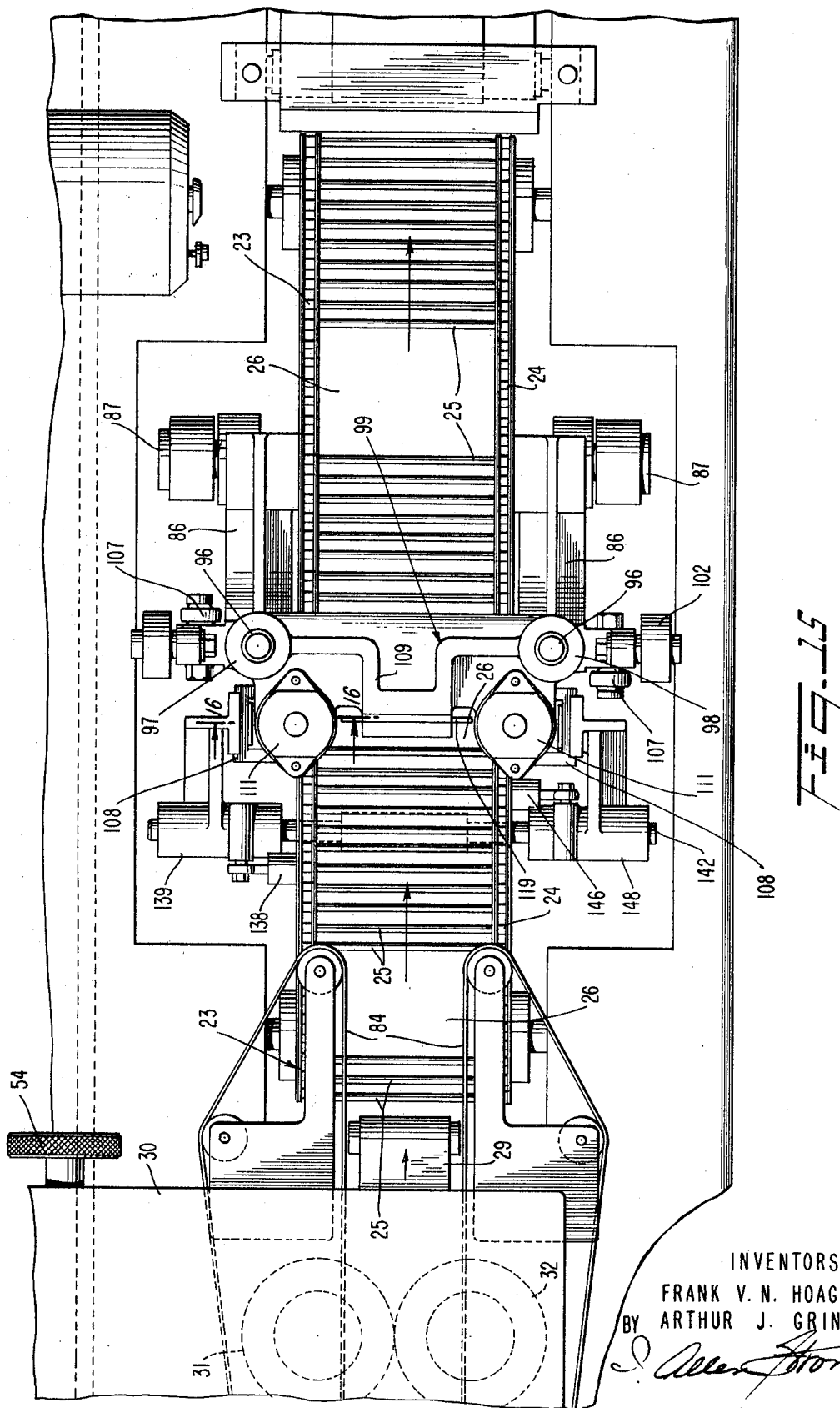

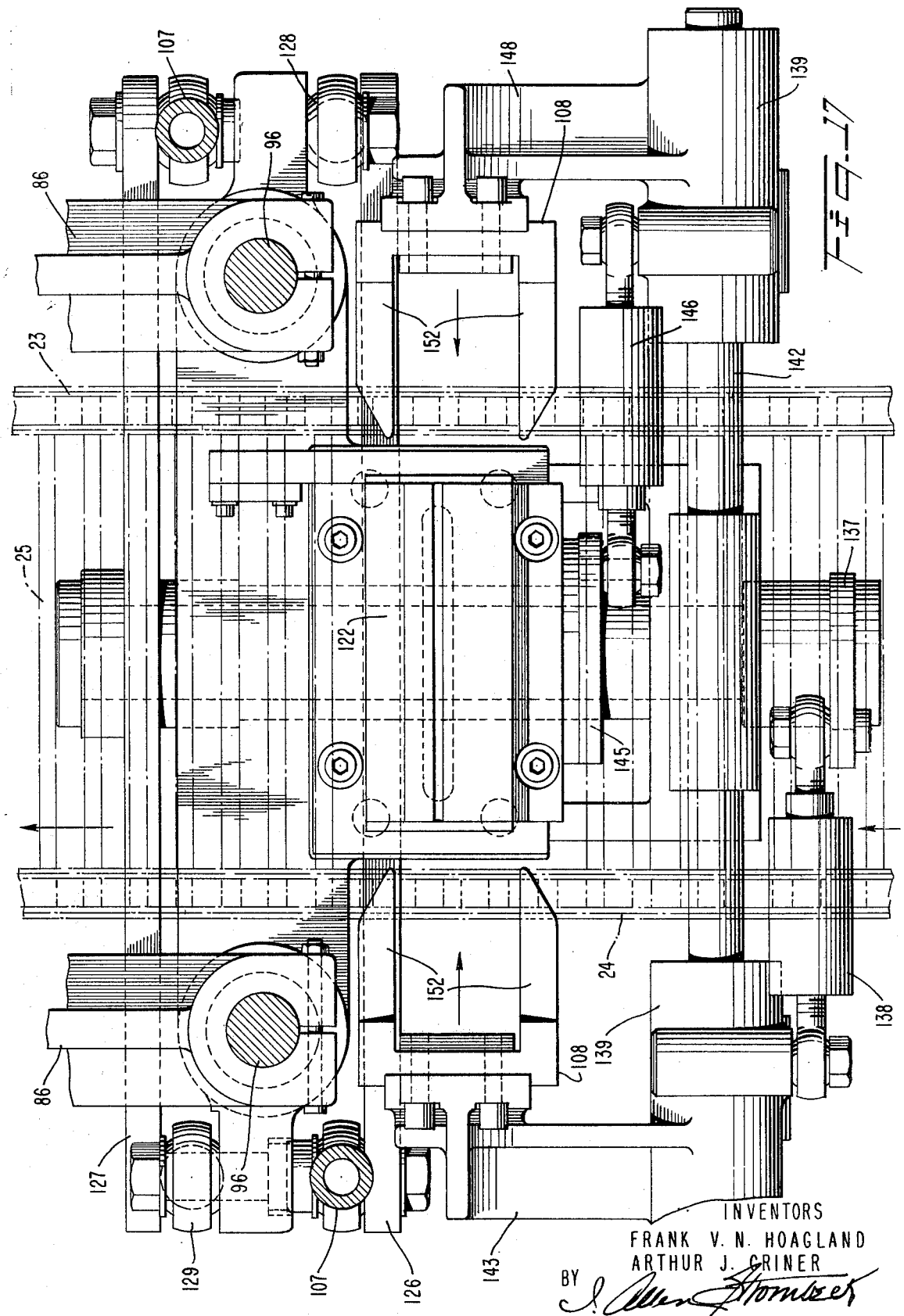

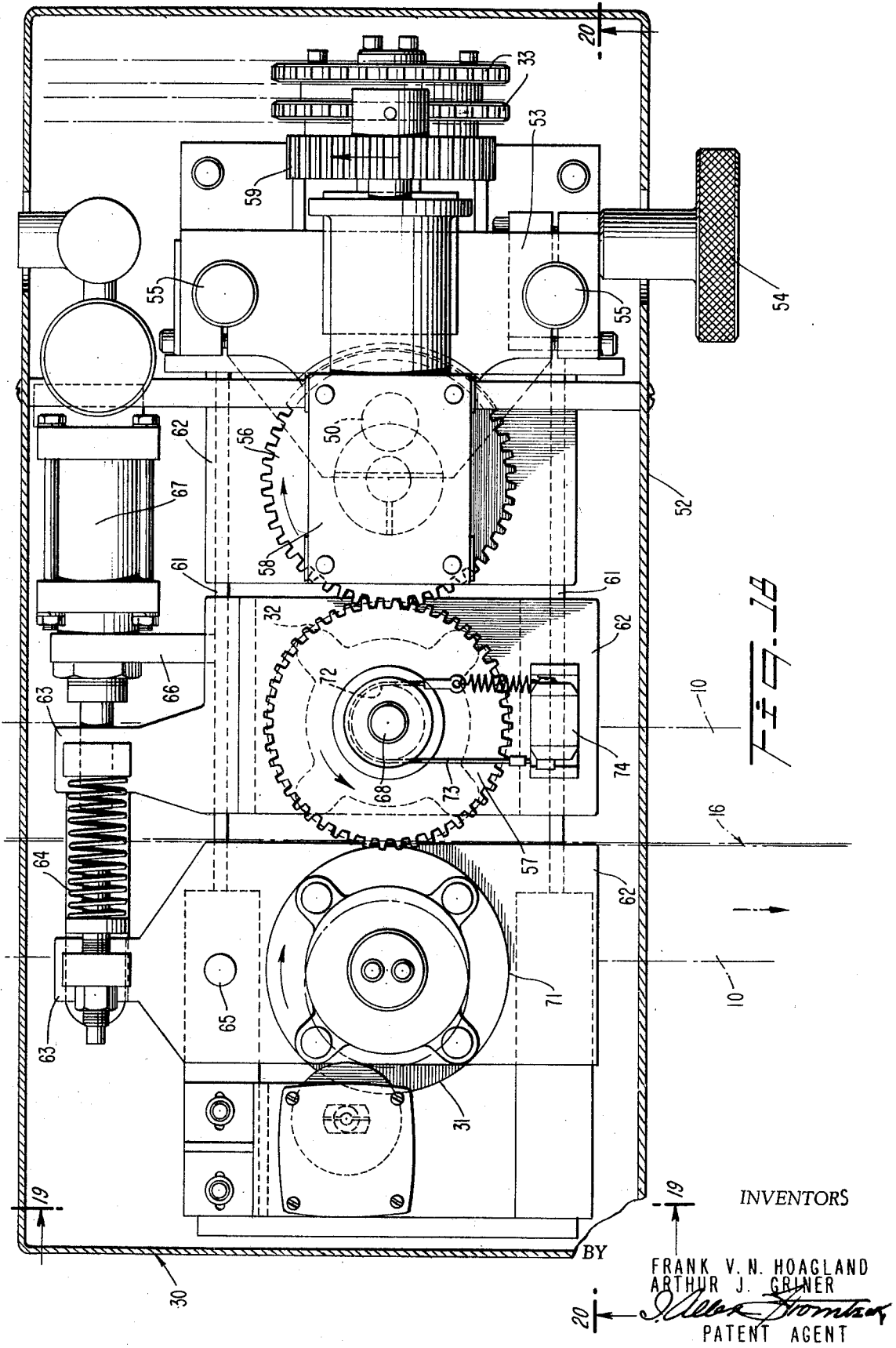

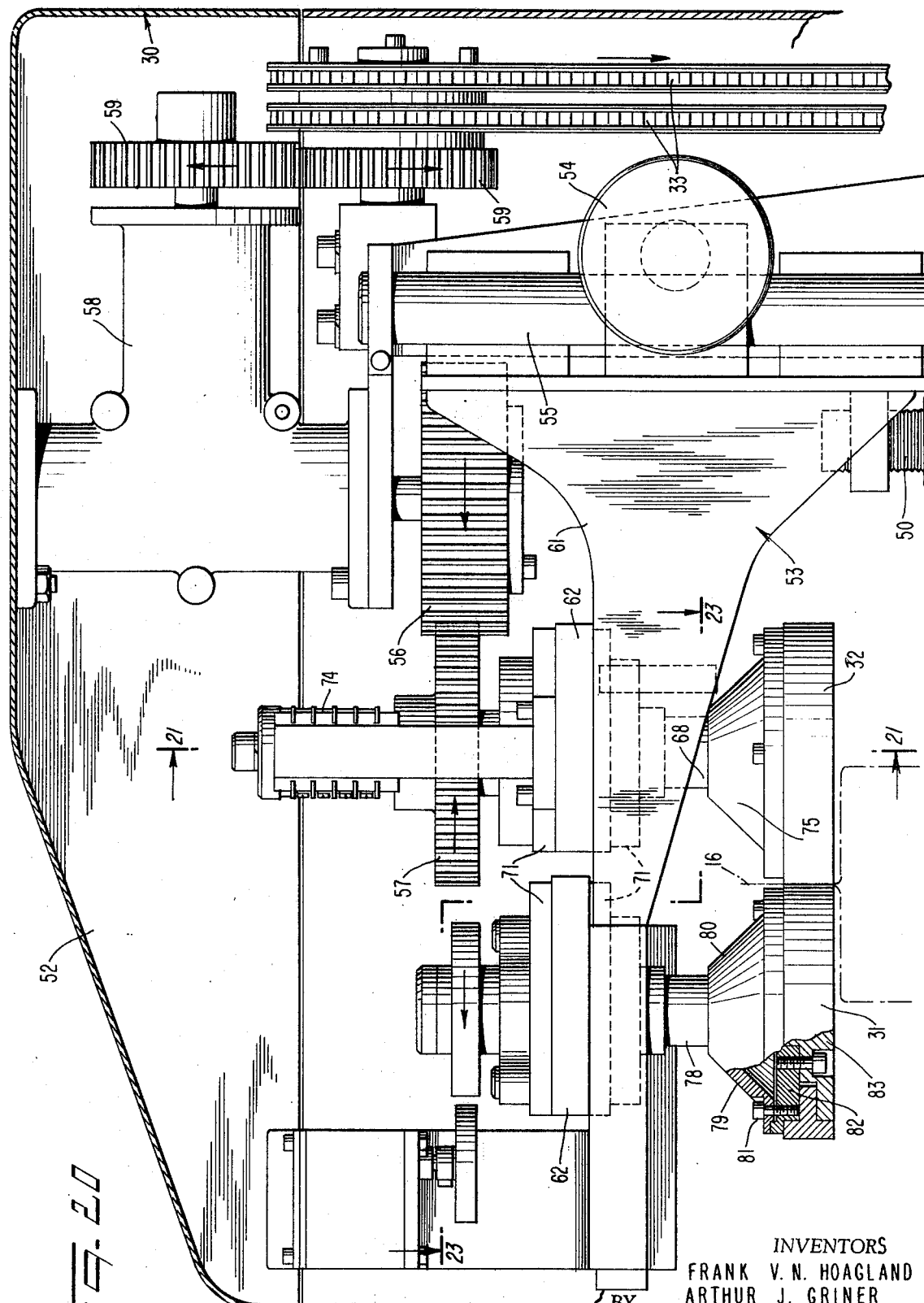

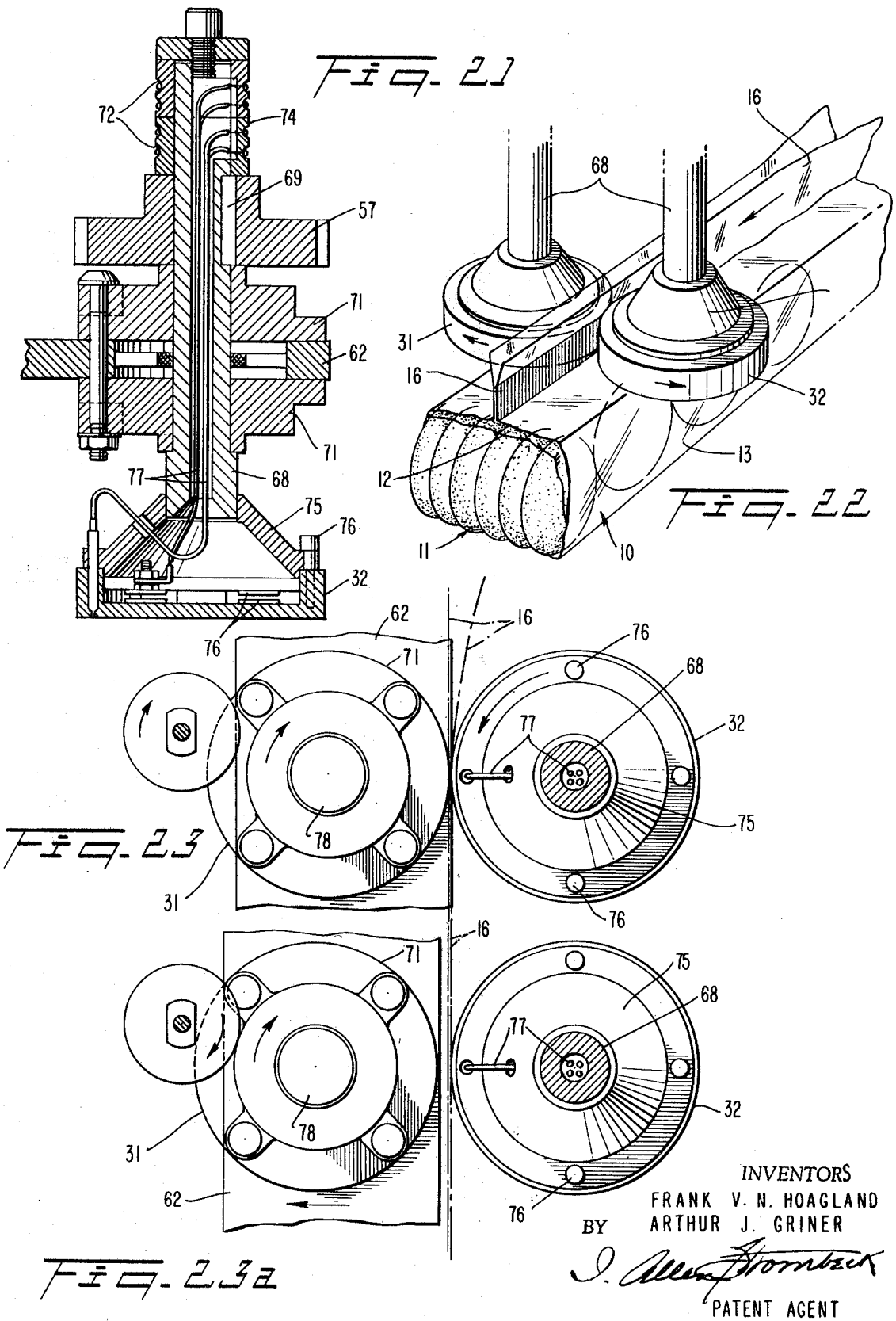

ABSTRACT OF THE DISCLOSURE

Unitary apparatus for continuous formation of a transparent film overwrap about advancing groups of prewrapped stacks of cookies. The apparatus comprises an infeed conveyor carrying spaced prewrapped stacks of cookies, a pusher device for accumulating predetermined numbers of individual prewrapped stacks of cookies, a wrapper forming device for shaping the overwrap film about the advancing spaced groups of cookies, a heat sealing unit for sealing the marginal free edges of the wrapper film to form a sealed longitudinal seam thereon, and a transverse sealing and severing mechanism operating in synchronism with the advancing spaced groups of stacked cookies to form unitary sealed packages thereof.

---

This invention relates to a machine for packaging cookies or like fragile food articles for display, the packaging being carried out by overwrapping prewrapped stacks of the product so that the display thereof is enhanced and protected.

An object of the invention is to provide an overwrap machine in which sealing and severing means are advanced with the packages being formed so that a high speed continuous operation is possible without damage to the product.

A further object of the invention is to provide, in such overwrap machine, for the feeding of a transparent, heat sealable wrapper, along with a predetermined number of stacks of prewrapped cookies, at high speed continuously without stopping or starting to perform sealing, tucking and severing operations.

In the feeding of stacks of prewrapped cookies the metering of the stacks must be accurately synchronized so that the operations of sealing, severing and tucking are effected at the proper place and time during the travel of the packages, and to this end it is a further object of the invention to mechanically coordinate the feed of the wrapper and the feed of the prewrapped stacks with the operations of sealing, severing and tucking so that a continuous uninterrupted operation is achieved.

In the use of transparent overwrap material the latter must be handled so that crumpling of the outer wrapper will be prevented which would detract from the sales display of the product. It is an object of the invention, therefor, to provide an overwrap machine in which the outer wrapper is continuously applied as the prewrapped package to be encased is fed and the outer wrapper provided with a reinforcing means that also serves as a sealed closure for the package.

A further object is to mount sealing means, cutter means and material tucking means so that they will operate in unison to perform their work as the package advances through the machine.

Still further objects include the provision of a transparent, sealable wrapper into which individual spaced stacks of prewrapped cookies or the like are fed to a point where the wrappers is sealed at its opposite ends and severed to cut off the completed package with a label carrying portion thereon provided for identifying the product.

The closest art found by applicant is Pat. No. 3,172,245 issued to J. F. Acquarius et al. on Mar. 9, 1965 and which shows wrapping material passed over a forming element for tubular shaping to receive a product fed from a hopper. A knife means is shown for severing the wrapper along with heat sealing means. Applicant feeds prewrapped stacks of cookies which are spaced in groups of four for enclosure within the wrapper, which is shaped thereabout for overwrapment. Spacing of the stacks is important as it leaves spaces between the packages being formed and means are provided for sealing the wrapper and severing it in these spaces. The sealing, severing and a tucking means are all mounted in one unit which oscillates with the advancement of the stacks so that the operations are performed without stopping the feed of the packages being produced.

With the foregoing and other objects in view, the invention comprises certain constructions hereinafter described and then particularly pointed out in the claims and a preferred embodiment of the invention is illustrated in the accompanying drawings, in which:

FIG. 1 is a view in side elevation of the infeed end of the machine including the wrapper supply and overwrap locations;

FIG. 2 is a view in side elevation of that portion of the machine continuing from the overwrap location and including the seam forming and tucking mechanisms;

FIG. 3 is a view in side elevation of the outfeed end of the machine including the take-off conveyor upon which the wrapped stacks of cookies are deposited;

FIG. 4 is an enlarged view in sectional elevation of the flange sealing and severing mechanism, the view being taken substantially on the line 4—4 of FIG. 2;

FIG. 5 is a vertical section taken on the line 5—5 of FIG. 4 showing also the package conveyor and the packages in outline;

FIG. 6 is a view in perspective showing the operating means for raising and lowering the flange sealing and severing means, and actuating the tucker means;

FIG. 7 shows, in perspective, the initial open position of the upper and lower flange forming and sealing blocks including the severing means and the tucking device for operation in conjunction therewith;

FIG. 8 is a view similar to FIG. 7 showing the half-closed position of the parts illustrated in the latter figure;

FIG. 9 shows the completely closed position of the parts in the flange forming and sealing location as well as the tucker, the adjoining packages being shown in outline;

FIG. 10 is a view in perspective of the overwrapped package with the end flanges shown sealed and severed and the position of a closure flange or seam which closes the overwrap material at its meeting edges to provide a package closure and reinforcement means;

FIG. 11 is a view in elevation of that part of FIG. 4 illustrating the tucker mechanism in closed position;

FIG. 12 is a vertical section taken substantially on the line 12—12 of FIG. 11 showing the sealing and tucking positions of the parts;

FIG. 12a is a view similar to FIG. 12 showing the knife blade in severing position;

FIG. 13 is an enlarged section taken on the line 13—13 of FIG. 4 showing one of the over-ride mechanisms used in connection with the tucker jaws, these mechanisms being also shown in operating relation in FIG. 17;

FIG. 14 is an enlarged view in sectional elevation taken on the line 14—14 of FIG. 2, additional structure of the flange sealing and severing parts and the tucker being shown in FIG. 5;

FIG. 15 is a plan view taken substantially on the line 15—15 of FIG. 2 showing the positions of the openings in the package conveyor and the location of the vertical over-ride mechanisms associated with the sealing unit and severing mechanisms, and the tucker mechanism;

FIG. 16 is an enlarged section on the line 16—16 of FIG. 15 showing the structure of one of the vertical over-ride mechanisms;

FIG. 17 is a sectional plan view on the line 17—17 of FIG. 4 showing the lower sealing jaw or anvil, also the tuckers and the operating parts connected thereto;

FIG. 18 is an enlarged sectional plan view on the line 18—18 of FIG. 2 taken through the heater roll housing to show the rolls for forming the top seam of the reinforcement closure strip;

FIG. 20 is a vertical section taken on the line 20—20 of FIG. 18;

FIG. 21 is a vertical section on line 21—21 of FIG. 20 showing the means for heating the sealing roller for closing the top seam of the package;

FIG. 22 is a view in perspective of the rolls used in forming the top seam longitudinally of the package;

FIG. 23 is a schematic plan view showing the heating rolls when the wrapper is present; and FIG. 23a is a view similar to FIG. 23 showing the rolls separated when the wrapper is absent, the machine stopped or action of the operating parts impeded.

Figure 19:
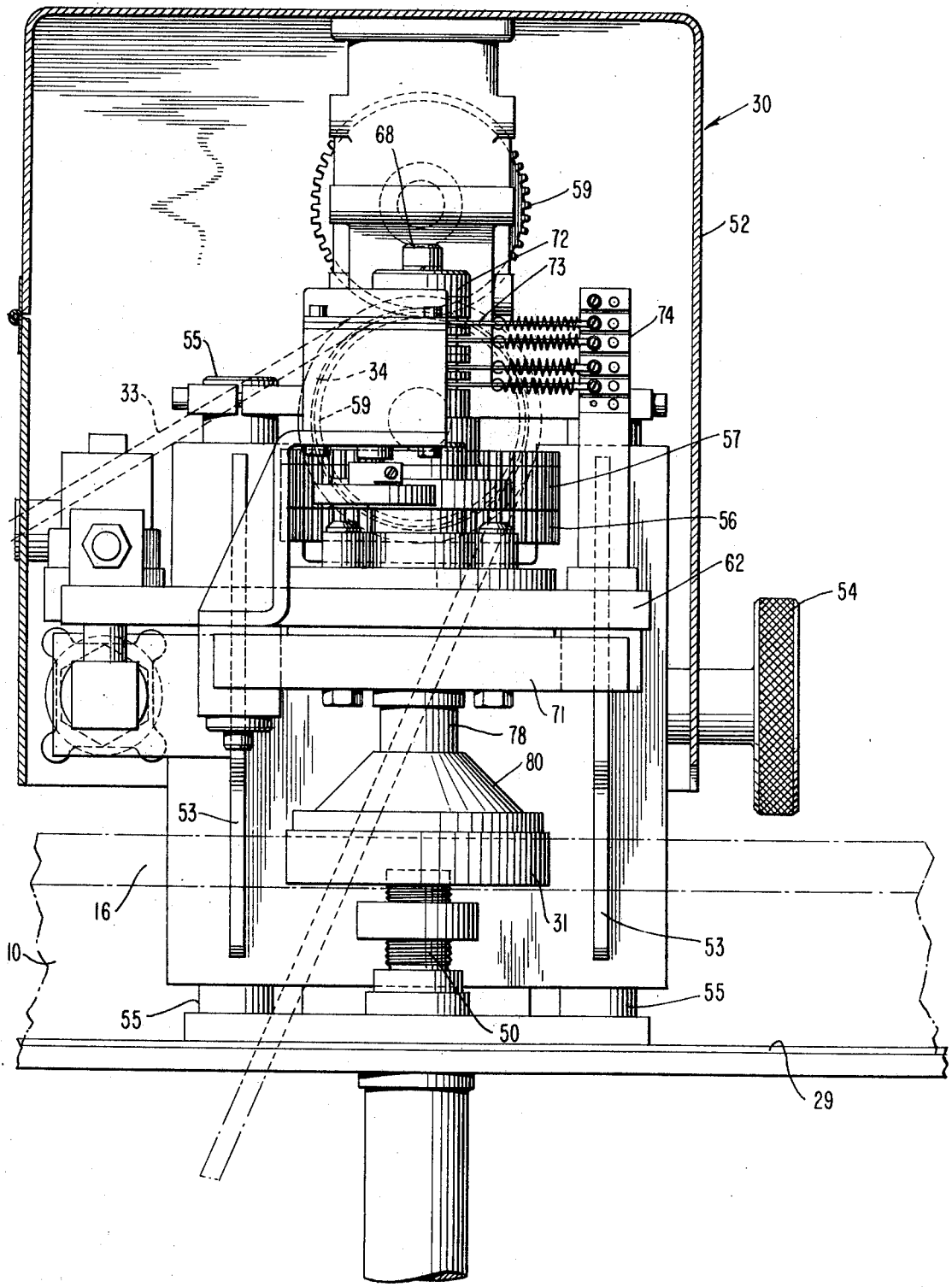
FIG. 19 is a vertical section of the seaming roll housing taken on the line 19—19 of FIG. 18.

Referring to the drawings in detail and in particular to FIG. 10, the finished package is represented by numeral 10 and consists of a group or collection of stacks 11 of cookies, or the like, which have been encased in stack wrappers 12 of transparent material and enclosed in an outer wrapper 13 which is referred to herein as an overwrap because the transparent material is wrapped about the stacks 11 sealed as at 14 with flanges at opposite ends which are separated to provide the individual packages. The material 13 as it is wrapped about the stacks 11 is sealed along its upper edge to provide a folded seam 16, which extends longitudinally of the pack, and due to the compression of the material between the packages, in sealing and severing operations tightens the material to provide a longitudinal reinforcement for the package.

As seen in FIG. 1, the stacks 11 of cookies are fed by a combination of side and bottom belts 17 through a metering device 18 to travel in spaced relation to a plate 19 where they accumulate in groups of four laterally arranged stacks to be propelled by pushers 21 depending from the lower reach of a sprocket chain pusher carrier 22 of any well known form. The pushers 21 propel groups of four contacting stacks along a chain conveyor 23 (FIG. 15) the links 24 of which mount cross rods 25, the rods being spaced at intervals as at 26 to permit operation of the sealing and severing means, to be described. A band of wrapping material 27 is fed over suitable pulleys 28 from a supply source over and along a belt 29 to a point short of the chain conveyor 23 as seen in FIGS. 1 and 2. The material of the wrapper 27 is transparent and is heat sealable and passes about a suitable shaping form, plate or nozzle 28 to lead the wrapper up, over and around the ends of the stacks to terminate at its meeting edges in a longitudinally extending top seam 16 along the top of the stacks transversely thereof preparatory to being fed to the sealing station indicated as at 30 in FIGS. 2 and 15, the sealing rolls being designated as at 31 and 32. After the wrapping material has been shaped about the stacks 11, which are in groups of four, FIG. 1, side and bottom belts 29 feed the packaged stacks continuously through the sealing station 30 and the rolls 31 and 32 seal the upstanding edges of the seam 16 (see FIG. 22) which is pulled flat by a flange sealing and severing means to be later described.

The pusher carrier 22 is driven by a suitable sprocket chain 33 passing under a tensioning adjuster 35 and about pulleys 34 to provide a drive for the seam sealing rolls 31 and 32; the bottom belt 29, which is automatically tensioned by a counterweight 36, and the conveyor chain 23. The chain 23 is driven by chain 33 from a gear 38 mounted on a cam shaft 39 driven through suitable gearing from a motor 41 through the coupling 42. The shaft 39 mounts two cams 43 and 44 for controlling the vertical and horizontal movements respectively, of a sealing and tucking unit 45 (FIG. 2). The cam 43 controls the opening and closing movement of the heat sealing dies and tucker means of unit 45 while the cam 44 controls the horizontal movements thereof.

After the packages pass beneath the unit 45, on the conveyor 23, they advance onto a belt 46 (FIGS. 2 and 3) to be discharged onto a take-away conveyor 47 for further processing. The belt 46 driven from chain 33 is also counterweighted as at 48 and can be vertically adjusted at its discharge end by an adjusting unit 49, secured at its upper end to a pivoted support arm 51 in which the belt conveyor 46 operates.

The sealing station 30, suitably covered by a housing 52, includes a vertically movable carrier 53 FIGS. 18, 19, 20 and 21, adjustable through a screw 50 and a hand wheel 54 on vertical posts 55 secured in the frame of the machine so that a wide drive gear 56 will mesh with a gear 57 keyed to the spindle of a heating roll 32. The gear 56 is driven through a gear box 58 from meshing gears 59 operated by the chain drive 33 above referred to. The carrier 53 has side plates 61 across which are mounted platforms or tables 62 that support the sealing roll assemblies 31 and 32. Two of the tables 62 provide extensions 63 for supporting a yieldable connector 64 between said extensions so that the plate 62 or table supporting the cold sealing roller assembly 31 can be swung on its pivot 65 to separate the roller 31 from the hot roller 32 to prevent scorching of the seam material 16. A side plate 61 carries a bracket 66 for support of a pneumatically controlled roller operating means 67 attached at one end to the connector 64.

As shown in FIGS. 18 and 21 the hot sealing roller assembly 32 consists of a hollow spindle 68 to which the gear 57 is keyed as at 69. The spindle 68 carries suitable bearing blocks 71 for mounting on the carrier 53 and adjacent its upper end contact rotor bands 72 about which extend spring tensioned contact strips 73 for transmitting current from a contact block 74. The lower end of the spindle carries an inverted cap 75 secured as at 76 to the cylindrical roller member 32 which is hollow and contains a heating element 76 to which current is fed through wires 77 extending from said rotor bands 72. The cold roller 31 consists of a spindle 78 supported for rotation, when in contact with roller 32, by a bearing block 71 supported on the carrier 53. The lower end of the spindle 78 (FIG. 20) is provided with a cap 80 secured as at 81 about its peripheral edge to a disk 82 which carries an inner bottom ring 83 for the support of the roller disk 31. The upstanding edges of the seam 16 are thus heat sealed along the length of the package in which four stacks extending laterally are overwrapped. The package at this stage appears as shown in FIG. 22, there being a space provided as previously explained between each group of four stacks. The package as a unit is fed by side belts 84 and a bottom belt 29 to a point indicated by the section line 4—4 in FIG. 2 where the rod conveyor 23 registers with the same plane as belt 29. The package 10 is fed along the conveyor 23 to the tucker and die unit station 45 whose operation will now be described.

The package, as completed, will contain four stacks of cookies with the material at the longitudinal ends thereof (FIG. 3) sealed to provide a closing flange or seam with the material tucked from the side ends and the top seam 16 as well as the end flanges or seams severed to define the completed package. The tucker and die unit 45 is supported for oscillating longitudinal movement lengthwise of the conveyor so that in its sealing, cutting and tucking operations it moves at the same speed as the travel of the package in discharge direction, so that the severing and sealing will not rumple the wrapper 13. To this end, the unit includes a frame 86 pivotally mounted as at 87 (see FIG. 2) to the upper ends of parallel arms 88 pivoted at their lower ends as at 89 to machine base supported trunnions 91. The frame 86 is reciprocated by a rod 92 actuated from the rocker cam 44 through a bell-crank 93 pivoted in a base supported trunnion 94. The upper opposite ends of the frame 86 (FIG. 5) are sleeved as at 95 to be slidably engaged by vertical shafts 96 on which are mounted upper and lower carrier sleeves 97 and 98, respectively, of the upper sealing jaw and cutter unit 99 and the lower slotted sealing anvil unit 101. The sealing jaw and cutter unit 99 is moved vertically by the connecting rods 102 at opposite sides thereof which are pivoted to a bell crank arrangement 103 which is actuated through a rod 104 suspended from a pivot bracket 105 by a cam bar 106 and arranged to be oscillated by the rocker cam 44. The unit 99 has depending rods 107 (FIGS. 4 and 6) which transfer the vertical motion of the sealing jaw and cutter unit 99 to the horizontal motion necessary to open and close the tucker jaws 108. The latter also move horizontally with the heat sealing jaws and cutter unit 99 so that when the ends of the package are tucked in, the material of the package will not be rumpled, as the unit will have an advance motion equal to the feeding rate of the packages.

The unit 99 (FIGS. 4, 5 and 16) includes a centrally disposed support 109 carrying at its ends sleeves 110 upon which are mounted vertical override means 111, each being secured in any suitable manner to the upper closure plate 112 of the sleeve 110, the override means 111 including a cap 113 housing a spring 114 bearing on an inner cap 115 carried by a stud shaft 116. The lower end of each shaft 116 supports the end of a crossbar 117 to which is secured an upper sealing jaw 118 through which operates a cutter 119 in a slot 121 thereof. The sleeves 98 (FIGS. 5 and 14) mount a lower sealing jaw 122 which is mounted on an anvil 123, spring supported as at 124, from a cross frame 125 connecting the sleeves 98. The sleeves 98 are actuated in unison with the sleeves 97 through the medium of rocker levers 126 and 127 which at their opposite ends are each connected by turnbuckles 128 and 129 to the sleeves 98 so that when the sealing jaw and cutter unit 99 lower, the lower sealing jaw 122 goes up to meet it and on contact the jaws seal the material of the overwrap wrapper, as shown in FIGS. 12 and 12a. The downward movement of the upper jaw 99, when it comes into sealing contact with the lower jaw 122, is arrested but the continuing downward movement of the cross bar 117 will cause the spring 114 of the vertical override means 111 to be compressed so that the knife may continue downwardly to sever the material at the point of sealing by the heating jaws. It will be noted, in FIGS. 12 and 12a, that the knife blade 119 is positioned slightly off center from the sealing unit so that, as seen in FIG. 10, a wider strip of sealed material is left at one end of the overwrap for the accommodation of an identifying tag or label. With this sealing operation, the upper fold seam 16 will be tightened longitudinally to strengthen the package.

At the same time that the sealing jaws are coming together the material of the wrapper is tucked in from opposite sides to provide a smooth overwrap and to this end, reference is made to FIGS. 4, 5, 6, 11, 12, 12a, 13 and 17 in FIGS. 5 and 6 of which a cross shaft 131 is mounted for oscillation in suitable spaced bearings 132 and 133 supported in the bottom of the frame 86. The shaft 131 has keyed thereto as at 134 end sleeves 135 and 136 to which are fixed the rocker lever 127 and a rock arm 137, the latter being connected through an override unit 138 with the mounting sleeve 139 which, with an integral sleeve 141, provides a slide bearing on the cross shafts 142 for an offset tucker jaw support arm 143 which is duplicated at the opposite side of the conveyor 23. The rocker lever 126 actuates a sleeve 144 having a rocker arm 145 which, at its upper end, is connected through an override unit 146 to the sleeved structure 147 of the oppositely disposed jaw support arm 148 above referred to. The offset portion of the support arms 143 and 148 is provided holding the tucker jaws 108 in lateral alignment with each other and in vertical relation to the heat sealing unit 99 and the anvil 101 as shown in FIGS. 12 and 12a.

The tucker jaws 108 are mounted in the upper ends of the arms 143 and 148 and are movable toward and away from tucking position, at the opposite sides of the package adjacent the sealing means, by the arms 137 and 145 through the override units 138 and 146 respectively. As seen in FIGURE 13 each override unit is similar in structure and includes interfitting outer and inner sleeves 149 and 151 respectively, held in yieldably closed position by a coil spring 152 so that when a pull is exerted on the rocker arms 137 and 145 the associated arms 143 and 148 slide along the cross shafts 142 to cause the tucker jaws to press or tuck in the material of the wrapper 10, as shown in FIGURE 9, in coordinated action with the closing of the sealing jaw 118 so that the material is pushed into the path of the latter as it descends by reason of the tapered inner faces 152 (FIGS. 7 and 8) of the tucking jaws 108. The effective closing force of the jaws 108 is cushioned by the action of the override units 138 and 146. The lower sealing jaw 122 as well as the upper sealing jaw 118 are bored to receive heating elements, not illustrated, of well known commercial availability.

When the packages 10 have passed through the die and tucker unit station 45 they are conveyed by the belt 46 to be discharged on an outfeed conveyor 47. Suitable control means 153 and 154 are employed to coordinate the speed of the feed belts and conveyors and control the heat applied to the sealing means which control means it is not deemed necessary to illustrate. It is evident that speed of production is increased by the accumulation of four or more prewrapped stacks into an overwrap cover with a decrease in breakage and complete packaging of the product at high speed. This is accomplished by feeding in the overwrap at the same speed that the packages are fed, then sealing and cutting the packages apart without the necessity of slowing down or stopping the forward feed of the material and product as the packaging line progresses. This also eliminates the need for inserting the prewrapped stacks into bags which operation would increase the possibility of breakage and crumbling of the cookies. In the overwrap process the prewrapped stacks are not handled manually and breakage is held to a minimum.

The invention is not to be restricted to the precise details of construction shown since various changes and modifications may be made therein without departing from the scope of the invention or sacrificing the advantages to be derived from its use.

What is claimed is:

1. In a packaging machine, comprising an infeed conveyor along which spaced prewrapped stacks of cookies are fed, pusher means for accumulating a predetermined number of prewrapped stacks in a group, shaping means for forming wrapping material about said stacks to form an elongated rectangular overwrap for the spaced groups thereof, means for sealing the adjoining edges of said material to provide a longitudinally extending seam, means for feeding the overwrapped packages as a unit, upper and lower jaw means for heat sealing said overwrap material between said prewrapped groups and to tighten said seam, jaw means for tucking in the material of the overwrap at opposite sides of said heat sealing means, means for severing said heat sealed portion to provide separate finished packages of predetermined groups of the prewrapped stacks for discharge from the machine, means for mounting said sealing jaws and severing means in a unit, means for imparting a horizontal movement to said unit to open and close said tucker jaws, and said heat sealing jaws moving with said unit whereby the advance movement of the unit equaling the feeding rate of the packages prevents the wrapper material from rumpling.

2. In a packaging machine, the means for sealing meeting edges of the material as defined in claim 1, including disk rolls, constituting a sealing roll assembly, in contact with the opposite sides of said seam, driving means for said rolls, a vertically movable carrier, side plates including tables for supporting said sealing roll assemblies, a yieldable connector associated with said tables, means whereby one of said tables can be pivotally swung to separate said rolls, and said means including a pneumatically controlled roller operating means attached to said connector.

3. In a packaging machine, the means for feeding the overwrapped packages as a unit as defined in claim 1, including a pusher conveyor means for accumulating a predetermined number of stacks in spaced relation from each other at an accelerated speed during the initial infeed travel of said stacks, a pair of feed belts, and coacting metering and control means for coordinating the speed of the feed belts and the operations of the sealing, severing and tucking means during the travel of said packages.

4. In a packaging machine, means for heat sealing overwrap material as defined in claim 1 including upper and lower sealing jaws movable as a unit in advance and retract directions, movable mounting means for said jaws for coordinating the advance movement thereof with the feed of the overwrapped packages during sealing operations, said movable mounting unit including a pivoted frame in which said jaws are mounted, means for oscillating said frames in advance and retract movements in coordination with the feed of the overwrap material, and means for raising and lowering said jaws during said advance and retract movements of the frame.

5. In a packaging machine means for tucking in the material as defined in claim 1 including opposed tucker jaws disposed in horizontal alignment with the median line of the prewrapped package and movable toward each other to tuck in the material of the package adjacent the seal, means for coordinating the action of said tucker jaws with the operation of said sealing jaw means including a pivoted frame in which the jaws are mounted, frame means for raising and lowering the sealing jaws and said frame means also operating to move the tucker jaws toward and away from said sealing jaws in coordination.

6. In a packaging machine, the means for severing the heat sealed portion as defined in claim 1, including a support for the upper sealing jaw, knife means in said support passing through said sealing jaw, override means associated with said knife and jaw means for providing advance of said knife in severing operation at the point of seal when said jaw completes its sealing movement, and said knife being mounted off center from said sealing unit so that a wider strip of sealing material is left at one side of the overwrap for the accommodation of an identifying label or the like.

7. In a packaging machine, comprising an infeed conveyor along which spaced prewrapped stacks of cookies are fed, pusher means for accumulating a predetermined number of prewrapped stacks in a group, shaping means for forming wrapping material about said stacks to form an elongated rectangular overwrap for the spaced groups thereof, means for sealing the adjoining edges of said material to provide a longitudinally extending seam, means for feeding the overwrapped packages as a unit, means for heat sealing said overwrap material between said prewrapped groups and to tighten said seam, including upper and lower sealing jaws movable as a unit in advance and retract directions, movable mounting means for said jaws for coordinating the advance movement thereof with the feed of the overwrap packages during sealing operations, the movable mounting means for said jaws including a pivoted frame in which said jaws are mounted, means for oscillating said frame in advance and retract movements in coordination with the feed of the overwrap material, means for raising and lowering said jaws during said advance and retract movements of said frame, means for tucking in the material at opposite sides of said heat sealing means, and means for severing said heat sealed portion to provide separate finished packages of predetermined groups of the prewrapped stacks for discharge from the machine.

8. In a packaging machine, comprising an infeed conveyor along which spaced prewrapped stacks of cookies are fed, pusher means for accumulating a predetermined number of prewarpped stacks in a group, shaping means for forming wrapping material about said stacks to form an elongated rectangular overwrap for the spaced groups thereof, means for sealing the adjoining edges of said material to provide a longitudinally extending seam, means for feeding the overwrapped packages as a unit, means for heat sealing said overwrap material between said prewrapped groups and to tighten said seam, including means for tucking in the material including opposed tucker jaws disposed in horizontal alignment with the median line of the prewrapped package and movable toward each other to tuck in the material of the package adjacent the seal, means for coordinating the action of the tucker and sealing jaws including a pivoted frame in which the jaws are mounted, frame means for raising and lowering the sealing jaws, said frame means also operating to move the tucker jaws toward and away from said sealing jaws in coordination, and means for severing said heat sealed portion to provide separate finished packages of predetermined groups of the prewrapped stacks for discharge from the machine.

9. In a packaging machine for use with a continuous web of packaging material formed into a tubular-shaped package encasing spaced stacks of cookies, the combination of coacting sealing means for heat sealing the longitudinal adjoining margins of the web to form an upstanding reinforcement strip, a pair of heat sealing jaws movable in retractable and advance directions to coordinate the travel of the jaws in advance direction with the travel of the package, means for moving the jaws into engagement to tighten the seam and flatten said strip by forming a transverse seal in the material intermediate the groups of stacks, means operable by the movement of said jaws for tucking in the material at opposite sides of said jaws and knife means mounted off center operable in one of said jaws for severing the material at the location of said seal to form individual packages, said knife being mounted off center with respect to said sealing unit so that a wider strip of sealing material is left at one side of the overwrap for the accommodation of an identifying label, and means for coordinating the movements of said sealing means, the material tucking means and the knife means with the travel of said overwrap material.

10. In a packaging machine, the combination of: vertically coacting heat sealing jaws, horizontally coacting tucker jaws, means for moving the sealing and tucker jaws in coordination with the travel of a package line under construction, and a severing knife mounted in offset relation in one of said heat sealing jaws for severing said package line into individual packages to provide narrow and wide strips, said wide strip accommodating label or the like.

References Cited

UNITED STATES PATENTS

| | | | |
|---|---|---|---|
| 2,747,346 | 5/1956 | Tigerman et al. | 53—28 |
| 3,303,630 | 2/1967 | Harm | 53—28 |
| 3,325,966 | 6/1967 | Bruce et al. | 53—182 X |
| 3,353,327 | 11/1967 | Cutler et al. | 53—28 |
| 3,417,544 | 12/1968 | Grevich | 53—180 |

FOREIGN PATENTS 928,606  6/1963  Great Britain.

THERON F. CONDON, Primary Examiner

EUGENE F. DESMOND, Assistant Examiner